(12) United States Patent
Liu et al.

(10) Patent No.: US 7,674,037 B2
(45) Date of Patent: Mar. 9, 2010

(54) PERFORMANCE TESTING APPARATUS FOR HEAT PIPES

(75) Inventors: Tay-Jian Liu, Tu-Cheng (TW);
Chao-Nien Tung, Tu-Cheng (TW);
Chih-Hsien Sun, Tu-Cheng (TW);
Chuen-Shu Hou, Tu-Cheng (TW);
Cheng-Hui Lin, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 495 days.

(21) Appl. No.: 11/309,332

(22) Filed: Jul. 27, 2006

(65) Prior Publication Data

US 2007/0133656 A1 Jun. 14, 2007

(30) Foreign Application Priority Data

Dec. 9, 2005 (CN) .................. 2005 1 0102310

(51) Int. Cl.
*G01K 1/16* (2006.01)
*G01K 25/00* (2006.01)

(52) U.S. Cl. .................. 374/44; 374/29; 374/137; 374/208; 374/5; 374/147; 374/57

(58) Field of Classification Search .......... 374/4, 374/29–32, 39, 43–44, 57, 137, 147, 152, 374/179, 208, 5, 141
See application file for complete search history.

(56) References Cited

U.S. PATENT DOCUMENTS

| | | | | |
|---|---|---|---|---|
| 3,453,865 A | * | 7/1969 | Reiter et al. ............... 374/33 |
| 4,067,237 A | * | 1/1978 | Arcella .................. 73/204.23 |
| 4,595,297 A | * | 6/1986 | Liu et al. .................. 374/29 |
| 5,248,198 A | * | 9/1993 | Droege ..................... 374/7 |
| 5,355,683 A | * | 10/1994 | Taylor .................... 62/51.1 |
| 5,707,152 A | * | 1/1998 | Krywitsky .............. 374/208 |
| 6,840,305 B2 | * | 1/2005 | Zheng et al. ............ 165/11.1 |
| 7,147,368 B2 | * | 12/2006 | Chien .................... 374/147 |
| 2001/0053172 A1 | * | 12/2001 | Sakowsky et al. ....... 374/147 |
| 2006/0026971 A1 | * | 2/2006 | Sharpe .................. 62/126 |

FOREIGN PATENT DOCUMENTS

| JP | 57086736 A | * | 5/1982 |
|---|---|---|---|
| TW | M279851 | | 11/2005 |

* cited by examiner

*Primary Examiner*—Gail Verbitsky
(74) *Attorney, Agent, or Firm*—Frank R. Niranjan

(57) ABSTRACT

A performance testing apparatus for a heat pipe includes an immovable portion having a cooling structure defined therein for cooling a heat pipe to be tested. A movable portion is capable of moving relative to the immovable portion and has a cooling structure defined therein for cooling the heat pipe. A receiving structure is located between the immovable portion and the movable portion for receiving the heat pipe therein. At least a temperature sensor is attached to at least one of the immovable portion and the movable portion for thermally contacting the heat pipe in the receiving structure for detecting temperature of the heat pipe. An enclosure encloses the immovable portion and the movable portion therein and has sidewalls thereof slidably contacting at least one of the immovable portion and the movable portion.

15 Claims, 6 Drawing Sheets

PERFORMANCE TESTING APPARATUS FOR HEAT PIPES

1. FIELD OF THE INVENTION

The present invention relates generally to testing apparatuses, and more particularly to a performance testing apparatus for heat pipes.

2. DESCRIPTION OF RELATED ART

It is well known that a heat pipe is generally a vacuum-sealed pipe. A porous wick structure is provided on an inner face of the pipe, and at least a phase changeable working media employed to carry heat is contained in the pipe. Generally, according to positions from which heat is input or output, a heat pipe has three sections, an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires testing before being used. The maximum heat transfer capacity (Qmax) and the temperature difference ($\Delta T$) between the evaporating section and the condensing section are two important parameters for evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

Conventionally, a method for testing the performance of a heat pipe is first to insert the evaporating section of the heat pipe into liquid at constant temperature; after a predetermined period of time and temperature of the heat pipe will become stable, then a temperature sensor such as a thermocouple, a resistance thermometer detector (RTD) or the like is used to measure $\Delta T$ between the liquid and the condensing section of the heat pipe to evaluate the performance of the heat pipe. However, Rth and Qmax can not be obtained from this test, and the performance of the heat pipe can not be reflected exactly by this test.

Referring to FIG. 6, a performance testing apparatus for heat pipes in accordance with related art is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. Simultaneously, by controlling flow rate and temperature of cooling liquid entering the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions of the heat pipe 2.

However, in the test, the related testing apparatus has drawbacks as follows: a) it is difficult to accurately determine lengths of the evaporating section 2a and the condensing section 2b which are important factors in determining the performance of the heat pipe 2; b) heat transference and temperature measurement may easily be affected by environmental conditions; c) it is difficult to achieve sufficiently intimate contact between the heat pipe and the heat source and between the heat pipe and the heat sink, which results in unsteady performance test results of the heat pipe. Furthermore, due to fussy and laborious assembly and disassembly in the test, the testing apparatus can be only used in the laboratory, and can not be used in the mass production of heat pipes.

In mass production of heat pipes, a large number of performance tests are needed, and the apparatus is used frequently over a long period of time; thus, the apparatus not only requires good testing accuracy, but also requires easy and accurate assembly with the heat pipes to be tested. The testing apparatus affects the yield and cost of the heat pipes directly; thus testing accuracy, facility, speed, consistency, reproducibility and reliability need to be considered when choosing the testing apparatus. Therefore, the related testing apparatus needs to be improved in order to meet the demand for testing during mass production of heat pipes.

What is needed, therefore, is a high performance testing apparatus for heat pipes suitable for use in mass production of heat pipes.

SUMMARY OF THE INVENTION

A performance testing apparatus for a heat pipe in accordance with a preferred embodiment of the present invention comprises an immovable portion having a cooling structure defined therein for cooling a heat pipe requiring testing. A movable portion is capable of moving relative to the immovable portion and has a cooling structure defined therein for cooling the heat pipe. A receiving structure is located between the immovable portion and the movable portion for receiving the heat pipe therein. At least a temperature sensor is attached to at least one of the immovable portion and the movable portion for thermally contacting the heat pipe in the receiving structure for detecting temperature of the heat pipe. An enclosure encloses the immovable portion and the movable portion therein, and has sidewalls thereof slidably contacting at least one of the immovable portion and the movable portion to guide the movable portion to have an accurate linear movement toward/away from the immovable portion.

Other advantages and novel features will become more apparent from the following detailed description of preferred embodiments when taken in conjunction with the accompanying drawings, in which:

BRIEF DESCRIPTION OF THE DRAWINGS

Many aspects of the present apparatus can be better understood with reference to the following drawings. The compo

DETAILED DESCRIPTION OF THE INVENTION

Figure 1:
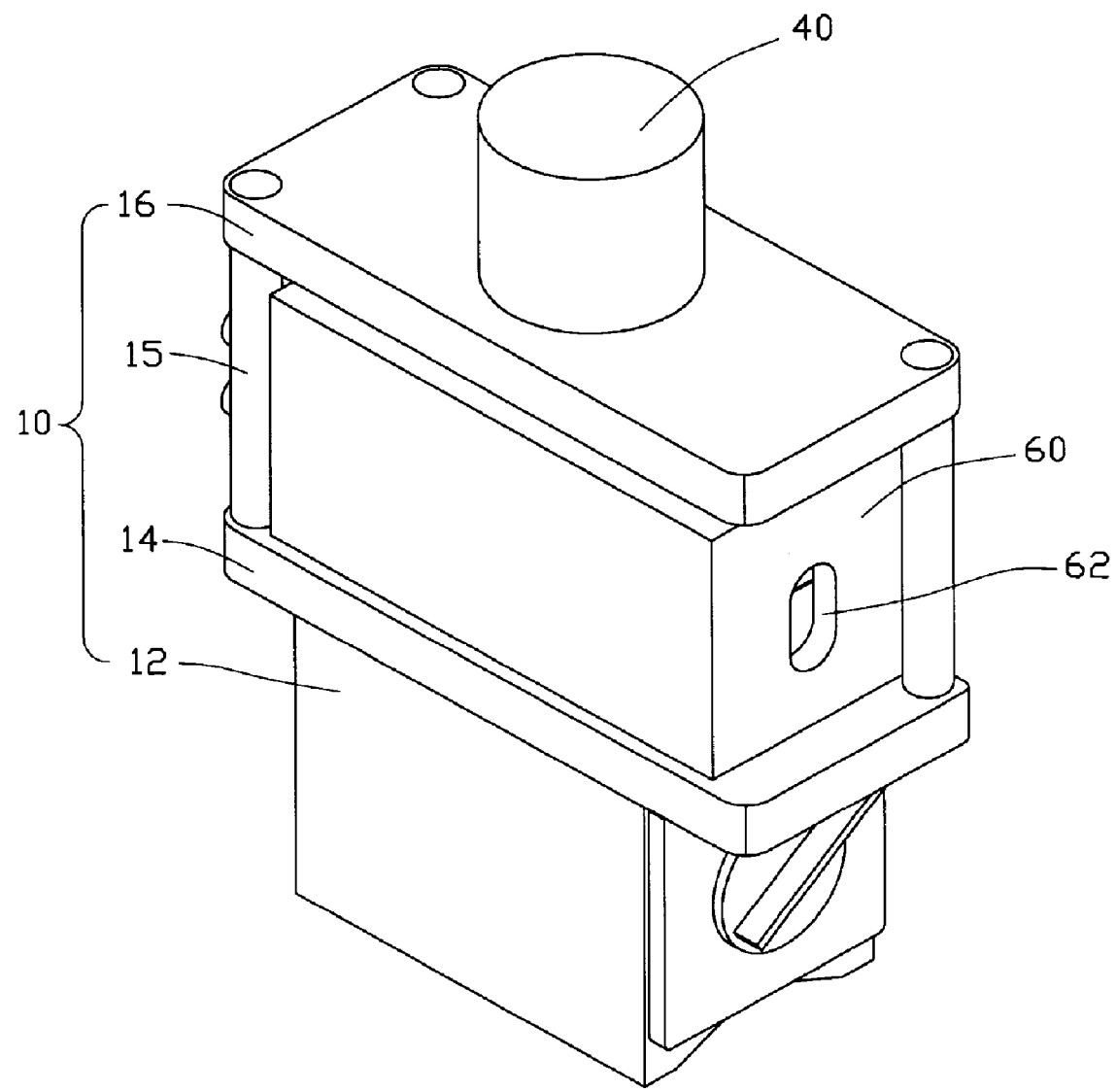
- FIG. 1 is an assembled view of a performance testing apparatus for heat pipes in accordance with a preferred embodiment of the present invention.
Figure 2:
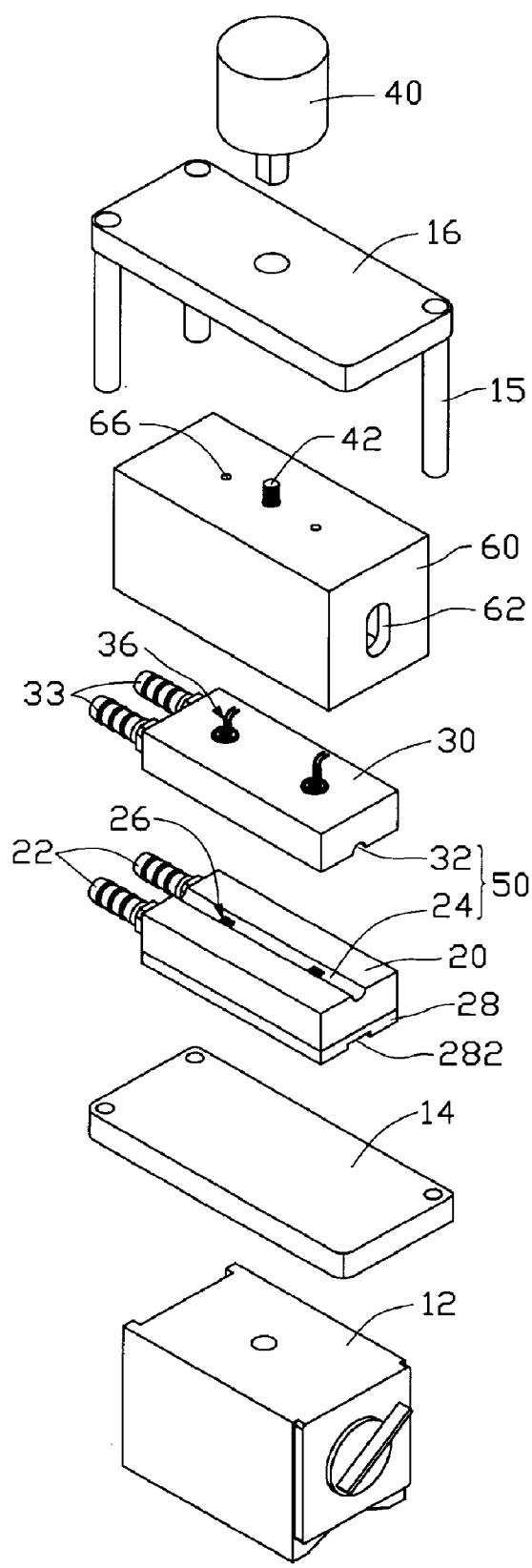
FIG. 2 is an exploded, isometric view of the testing apparatus of FIG. 1.
Figure 3:
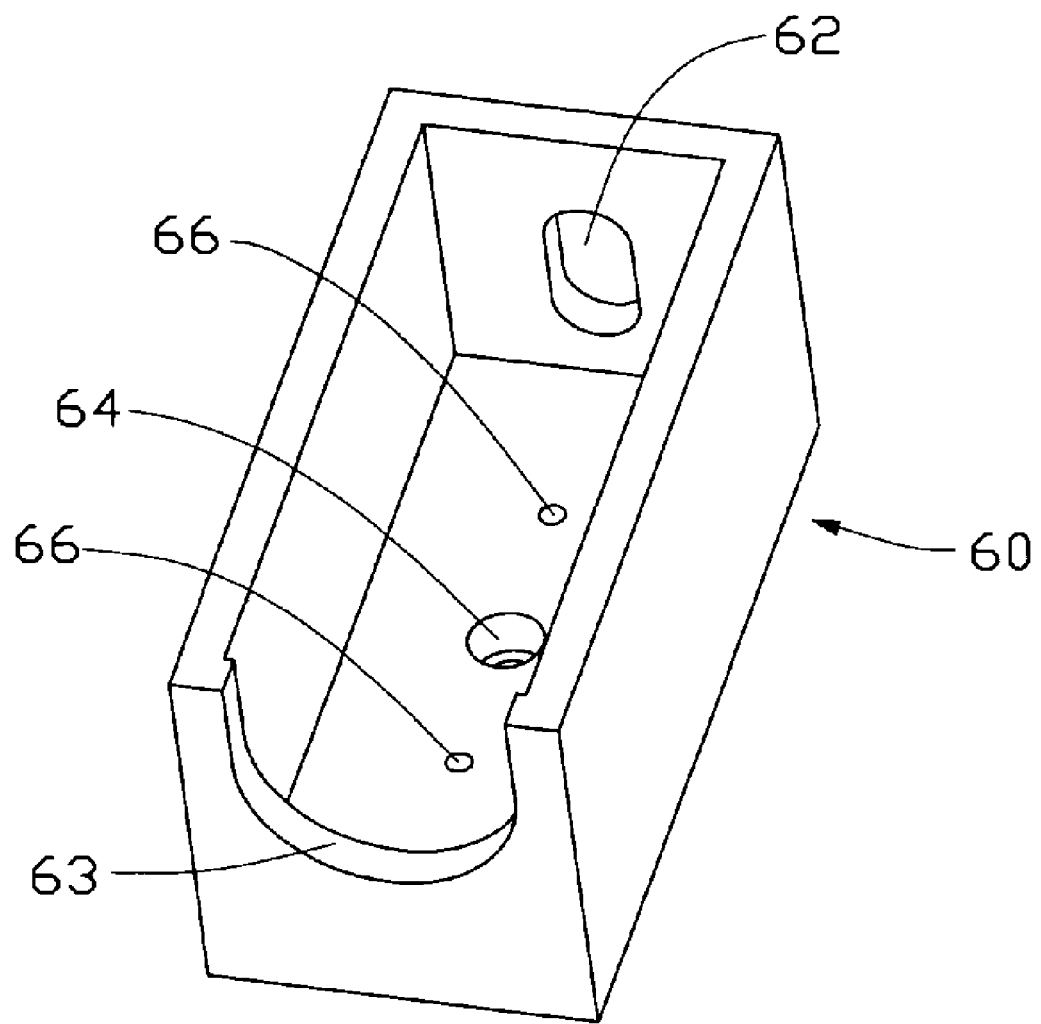
FIG. 3 shows an enclosure of the testing apparatus of FIG. 2 from a different aspect.

Referring to FIGS. 1-3, a performance testing apparatus for heat pipes comprises an immovable portion 20 and a movable portion 30 movably mounted on the immovable portion 20.

The immovable portion 20 is made of metal having good heat conductivity. Cooling passageways (not shown) are defined in the immovable portion 20, to allow coolant to flow therein. An inlet 22 and an outlet 22 communicate the passageways with a constant temperature coolant circulating device (not shown); therefore, the passageways, inlet 22, outlet 22 and the coolant circulating device corporately define a cooling system for the coolant circulating through the immovable portion 20 to remove heat from the heat pipe in test. The immovable portion 20 has a cooling groove 24 defined in a top face thereof, for receiving a condensing section of the heat pipe to be tested therein. Two temperature sensors 26 are inserted into the immovable portion 20 from a bottom thereof so as to position detecting portions (not labeled) of the sensors 26 in the cooling groove 24. The detection portions are capable of automatically contacting the heat pipe in order to detect a temperature of the condensing section of the heat pipe.

The movable portion 30 is made of metal having good heat conductivity, and has a cooling groove 32 in a bottom face thereof, corresponding to the cooling groove 24 of the immovable portion 20. A testing channel 50 is cooperatively defined by the cooling groove 24 and the cooling groove 32 when the movable portion 30 moves to reach the immovable portion 20. When the movable portion 30 moves to reach the immovable portion 20, a heat pipe received in the testing channel 50 can have an intimate contact with the movable and immovable portions 30, 20, thereby reducing heat resistance between the heat pipe and the movable and immovable portions 30, 20. Cooling passageways (not shown) are defined in an inner portion of the immovable portion 30, for coolant to flow therein. An inlet 33 and an outlet 33 communicate the passageways with a constant temperature coolant circulating device (not shown); therefore, the passageways, inlet 33, outlet 33 and the coolant circulating device cooperatively define a cooling system for the coolant to circulate through the movable portion 30 to remove heat from the heat pipe during testing. Two temperature sensors 36 are inserted into the movable portion 30 from a top thereof to reach a position wherein detecting portions (not shown) of the sensors 36 are located in the cooling groove 32 and are therefore capable of automatically contacting the heat pipe to detect the temperature of the condensing section of the heat pipe.

The testing channel 50 consisting of the cooling grooves 24, 32 as shown in the preferred embodiment has a circular cross section enabling it to receive the condensing section of the heat pipe having a correspondingly circular cross section. Alternatively, the testing channel 50 can have a rectangular cross section where the condensing section of the heat pipe also has a flat rectangular configuration and the cooling grooves 24, 32 each have a rectangular configuration.

In order to ensure that the heat pipe is in close contact with the movable and immovable portions 30, 20, a supporting frame 10 is used to support and assemble the immovable and movable portions 20, 30. The immovable portion 20 is fixed on the supporting frame 10. A driving device 40 is installed on the supporting frame 10 to drive the movable portion 30 to make accurate linear movement relative to the immovable portion 20 along a vertical direction, thereby realizing the intimate contact between the heat pipe and the movable and immovable portions 30, 20. In this manner heat resistance between the condensing section of the heat pipe and the movable and immovable portions 30, 20 can be minimized.

The supporting frame 10 comprises a seat 12 which may be an electromagnetic holding chuck, by which the testing apparatus can be easily fixed at any desired position which is provided with a platform made of ferroalloy. A first plate 14 is secured on the seat 12; a second plate 16 hovers over the first plate 14; a plurality of supporting rods 15 interconnect the first and second plates 14, 16 for supporting the second plate 16 above the first plate 14. The seat 12, the first and second plates 14, 16 and the rods 15 constitute the supporting frame 10 for assembling and positioning the immovable and movable portions 20, 30 therein. The first plate 14 has the immovable portion 20 fixed thereon. In order to prevent heat in the immovable portion 20 from spreading to the first plate 14, a thermally insulating plate 28 is disposed between the immovable portion 20 and the first plate 14. The insulating plate 28 has an elongated slot 282 defined in a bottom face thereof, wherein the bottom face abuts the first plate 14. Two through holes (not labeled) vertically extend through the insulating plate 28 and communicate with the slot 282, for extension of wires (not shown) of the temperature sensors 26 to connect with a monitoring computer (not shown).

In order to ensure that the immovable portion 20 and the movable portion 30 have good linear movement relative to each other, and keep the grooves 24, 32 of the immovable and movable portions 20, 30 in positions corresponding to each other, a cuboidal enclosure 60 having an opened bottom covers the immovable and movable portions 20, 30 therein. The enclosure 60 is located between the first and second plates 14, 16 of the supporting frame 10. The enclosure 60 has four sidewalls (not labeled) thereof slidably contacting side faces of the immovable portion 20. One of the sidewalls of the enclosure 60 defines an opening 62 located corresponding to the testing channel 50 between the immovable and movable portions 20, 30, whereby the condensing section of the heat pipe can be brought to extend into the testing channel 50 via the opening 62. A sidewall of the enclosure 60 opposite the sidewall where the opening 62 is defined defines an arced hatch 63 for the inlets 22, 33 and outlets 22, 33 to extend therethrough. A ceiling of the enclosure 60 contacts a top face of the movable portion 30 and defines therein a through hole 64 (FIG. 3) and two apertures 66 located at two sides of the through hole 64.

The driving device 40 in this preferred embodiment is a step motor, although it can be easily apprehended by those skilled in the art that the driving device 40 can also be a pneumatic cylinder or a hydraulic cylinder. The driving device 40 is installed on the second plate 16 of the supporting frame 10. The driving device 40 is fixed to the second plate 16 above ceiling of the enclosure 60. A shaft (not labeled) of the driving device 40 extends through the second plate 16 of the supporting frame 10. The shaft has a threaded end (not shown) threadedly engaging with a bolt 42 which is secured to the movable portion 30 and extends through the through hole 64 in the ceiling of the enclosure 60. When the shaft rotates, the bolt 42, the movable portion 30 and the enclosure 60 move upwardly or downwardly. The temperature sensors 36 have wires (not labeled) thereof extending through the apertures 66 of the enclosure 60 to connect with the monitoring computer. In use, the driving device 40 drives the movable portion 30 to move toward/away from the immovable portion 20, wherein by the always slidable contact between the sidewalls of enclosure 60 and the side faces of the immovable portion 20, an accurate movement between the movable portion 30 and the immovable portion 20 can be assured. For example, the movable portion 30 can be driven to depart a certain distance such as 5 millimeters from the immovable portion 20 to facilitate the condensing section of the heat pipe which needs to be tested to be inserted into the testing channel 50 or withdrawn from the testing channel 50 via the opening 62 of the enclosure 60 after the heat pipe has been tested. On the other hand, the movable portion 30 can be driven to move toward the immovable portion 20 to thereby realize an intimate contact between the condensing section of the heat pipe and the immovable and movable portions 20, 30 during which the test is performed. During the movement of the movable portion 30 together with the enclosure 60, the sidewalls of the enclosure 60 always slidably contact the side faces of the immovable portion 20. Accordingly, the requirements for testing, i.e. accuracy, ease of use and speed can be realized by the testing apparatus in accordance with the present invention. Furthermore, the enclosure 60 has good adiabatic property, which constructs a steady thermal environment for testing the heat pipes.

It can be understood, positions of the immovable portion 20 and the movable portion 30 can be exchanged, i.e., the movable portion 30 is located on the first plate 14 of the supporting frame 10, and the immovable portion 20 is fixed to the second plate 16 of the supporting frame 10, and the driving device 40 is positioned to be adjacent to the immovable portion 20. Alternatively, the driving device 40 can be installed to the immovable portion 20. In a further alternative, each of the immovable and movable portions 20, 30 has one driving device 40 installed thereon to move them toward/away from each other.

In use, the condensing section of the heat pipe is received in the testing channel 50 when the movable portion 30 is moved away from the immovable portion 20. Then the movable portion 30 is moved to reach the immovable portion 20 so that the condensing section of the heat pipe is tightly fitted into the testing channel 50. The sensors 26, 36 are in thermal connection with the condensing section of the heat pipe; therefore, the sensors 26, 36 work to accurately send detected temperatures of the condensing section of the heat pipe to the monitoring computer. Based on the temperatures obtained by the plurality of sensors 26, 36, an average temperature can be obtained by the monitoring computer very quickly; therefore, performance of the heat pipe can be very quickly decided.

Figure 4:
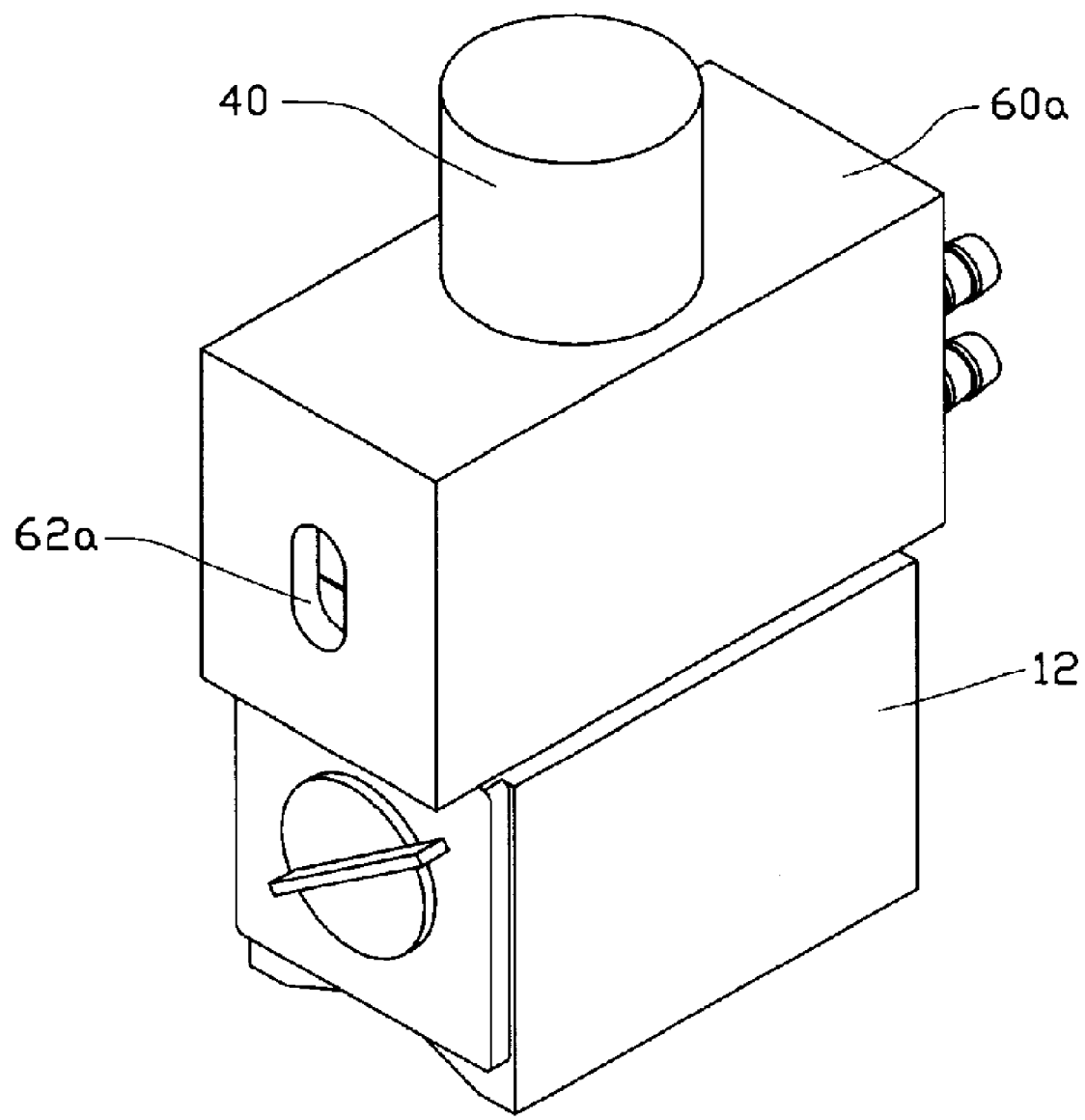
FIG. 4 is an assembled view of a performance testing apparatus for heat pipes in accordance with an alternative embodiment of the present invention.
Figure 5:
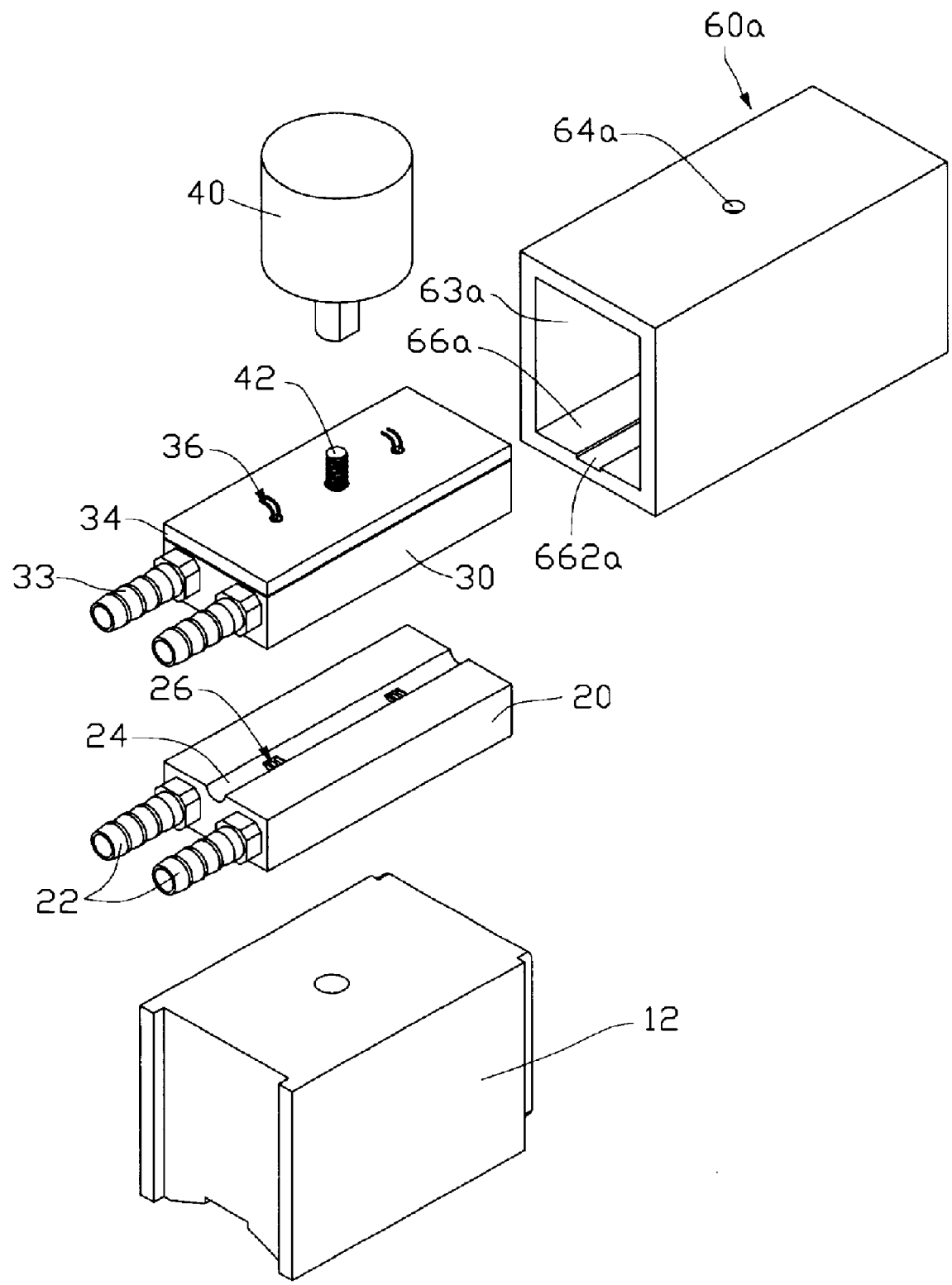
FIG. 5 is an exploded, isometric view of the testing apparatus of the FIG. 4.
Figure 6:
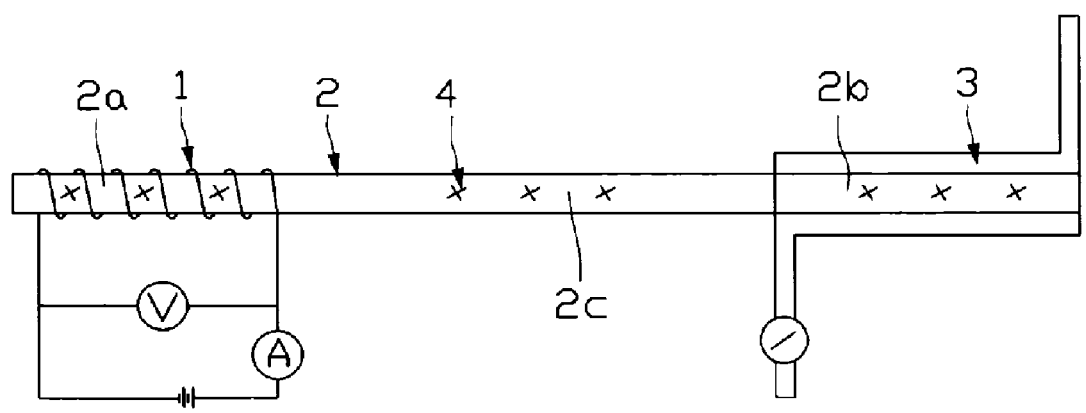
FIG. 6 is a performance testing apparatus for heat pipes in accordance with related art.

Referring to FIGS. 4 and 5, a performance testing apparatus for heat pipes in accordance with an alternative embodiment of the present invention is shown. The performance testing apparatus for heat pipes in accordance with this embodiment is similar to the previous preferred embodiment. The main difference therebetween is that an enclosure 60a further comprises a bottom wall 66a whereby the enclosure 60a can replace the enclosure 60 and first and second plates 14, 16 of the previous preferred embodiment. The enclosure 60a is directly positioned on the seat 12. An opening 62a is defined in a side face of the enclosure 60a and an entrance 63a is defined in an opposite side face of the enclosure 60a. The immovable and movable portions 20, 30 are disposed in the enclosure 60a from the entrance 63a. The bottom wall 66a defines a slot 662a for extension of wire of the temperature sensor 26 to connect with the monitoring computer. The driving device 40 is fixed to a ceiling of the enclosure 60a. The shaft of the driving device 40 threadedly engages with the bolt 42 which is secured to a board 34 of the movable portion 30 and extends through a through hole 64a defined in the ceiling of the enclosure 60a. When the driving device 40 operates, the shaft rotates, the bolt 42 with the board 34, and the movable portion 30 move upwardly or downwardly relative to the immovable portion 20 in the enclosure 60a. In this embodiment, the enclosure 60a does not move when the driving device 40 drives the movable portion 30 to move. Side faces of the movable portion 30 always in slidable contact with sidewalls (not labeled) of the enclosure 60a when the movable portion 30 moves toward/away from the immovable portion 20.

According to the embodiments of the present invention, the immovable and movable portions 20, 30 are disposed in the enclosure 60, thereby producing an accurate relative position to the immovable and movable portions 20, 30, therefore the accurate linear movement of the immovable and movable portions 20, 30 can be realized when the driving device 40 works. Furthermore, the enclosure 60, 60a provides a steady environment for testing performance of the heat pipes.

Additionally, in the present invention, in order to lower cost of the testing apparatus, the insulating plate 28, the board 34, and the enclosure 60, 60a can be made from low-cost material such as PE (Polyethylene), ABS (Acrylonitrile Butadiene Styrene), PF(Phenol-Formaldehyde), PTFE (Polytetrafluoroethylene) and so on. The immovable portion 20 and movable portion 30 can be made from copper (Cu) or aluminum (Al). The immovable portion 20 and the movable portion 30 can have silver (Ag) or nickel (Ni) plated on inner faces in the grooves 24, 32 to prevent the oxidization of the inner faces.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe comprising:

an immovable portion having a cooling structure defined therein for cooling the heat pipe needing test;

a movable portion capable of moving relative to the immovable portion and having a cooling structure defined therein for cooling the heat pipe;

a receiving structure located between the immovable portion and the movable portion for receiving the heat pipe therein;

at least a temperature sensor attached to at least one of the immovable portion and the movable portion for thermally contacting the heat pipe in the receiving structure for detecting temperature of the heat pipe; and an enclosure enclosing the immovable portion and the movable portion and having sidewalls thereof slidably contacting at least one of the immovable portion and the movable portion to thereby guide the movable portion to have an accurate movement toward and away from the immovable portion;

wherein the cooling structures of the immovable portion and the movable portion each have an inlet and an outlet extending through a hatch defined in one of the sidewalls of the enclosure;

wherein the receiving structure is a channel defined between the immovable portion and the movable portion; and wherein the channel is cooperatively defined by two face-to-face cooling grooves defined in the immovable portion and the movable portion respectively.

2. The testing apparatus of claim 1, wherein the at least a temperature sensor has a detecting portion exposed to the channel.

3. The testing apparatus of claim 1, wherein the enclosure has one of the sidewalls thereof defining an opening corresponding to the channel for extension of the heat pipe into the channel via the opening.

4. The testing apparatus of claim 1 further comprising a supporting frame having a seat for locating the testing apparatus at a required position.

5. The testing apparatus of claim 4, wherein the supporting frame comprises a first plate positioned on the seat, and a second plate supported by a plurality rods extending upwardly from the first plate.

6. The testing apparatus of claim 5, wherein the immovable portion is positioned on the first plate of the supporting frame, the enclosure is located between the first and second plates of the supporting frame, and has a ceiling thereof contacting the movable portion.

7. The testing apparatus of claim 6, wherein the enclosure has the sidewalls thereof slidably contacting side faces of the immovable portion.

8. The testing apparatus of claim 6 further comprising a driving device for driving the movable portion to move away and toward the immovable portion, wherein the driving device is mounted on the second plate of the supporting frame and connects with the movable portion and the ceiling of the enclosure via a bolt.

9. The testing apparatus of claim 6, wherein an insulating plate is sandwiched between the immovable portion and the first plate of the supporting frame.

10. The testing apparatus of claim 4, wherein the enclosure has a bottom wall sitting on the seat of the supporting frame, and a ceiling thereof positioned over the movable portion.

11. The testing apparatus of claim 10, wherein the enclosure slidably contacts side faces of the movable portion.

12. The testing apparatus of claim 10 further comprising a driving device for driving the movable portion to move away and towards the immovable portion, wherein the driving device is mounted on the ceiling of the enclosure and connects with the movable portion via a bolt.

13. The testing apparatus of claim 10, wherein the seat is an electromagnetic holding chuck.

14. A performance testing apparatus for a heat pipe comprising:

an immovable portion having a cooling structure defined therein for cooling the heat pipe needing test;

a movable portion capable of moving relative to the immovable portion and having a cooling structure defined therein for cooling the heat pipe;

a receiving structure located between the immovable portion and the movable portion for receiving the heat pipe therein;

at least a temperature sensor attached to at least one of the immovable portion and the movable portion for thermally contacting the heat pipe in the receiving structure for detecting temperature of the heat pipe;

an enclosure enclosing the immovable portion and the movable portion and having sidewalls thereof slidably contacting at least one of the immovable portion and the movable portion to thereby guide the movable portion to have an accurate movement toward and away from the immovable portion; and a supporting frame having a seat for locating the testing apparatus at a required position;

wherein the cooling structures of the immovable portion and the movable portion each have an inlet and an outlet extending through a hatch defined in one of the sidewalls of the enclosure;

wherein the enclosure has a bottom wall sitting on the seat of the supporting frame, and a ceiling thereof positioned over the movable portion; and wherein the seat is an electromagnetic holding chuck.

15. A performance testing apparatus for a heat pipe comprising:

an immovable portion having a cooling structure defined therein for cooling the heat pipe needing test;

a movable portion capable of moving relative to the immovable portion and having a cooling structure defined therein for cooling the heat pipe;

a receiving structure located between the immovable portion and the movable portion for receiving the heat pipe therein;

at least a temperature sensor attached to at least one of the immovable portion and the movable portion for thermally contacting the heat pipe in the receiving structure for detecting temperature of the heat pipe; and an enclosure enclosing the immovable portion and the movable portion and having sidewalls thereof slidably contacting at least one of the immovable portion and the movable portion to thereby guide the movable portion to have an accurate movement toward and away from the immovable portion;

wherein the receiving structure is a channel defined between the immovable portion and the movable portion; and wherein the channel is cooperatively defined by two face-to-face cooling grooves defined in the immovable portion and the movable portion respectively.

* * * * *